United States Patent
Cong et al.

(10) Patent No.: US 8,214,806 B2
(45) Date of Patent: Jul. 3, 2012

(54) ITERATIVE, NON-UNIFORM PROFILING METHOD FOR AUTOMATICALLY REFINING PERFORMANCE BOTTLENECK REGIONS IN SCIENTIFIC CODE

(75) Inventors: Guojing Cong, Ossining, NY (US); Peter Kenneth Malkin, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 1420 days.

(21) Appl. No.: 11/746,171

(22) Filed: May 9, 2007

(65) Prior Publication Data

US 2008/0282232 A1  Nov. 13, 2008

(51) Int. Cl.
*G06F 9/45* (2006.01)
(52) U.S. Cl. ........................................ 717/127
(58) Field of Classification Search .................... 717/127
See application file for complete search history.

(56) References Cited

U.S. PATENT DOCUMENTS

| | | | | |
|---|---|---|---|---|
| 6,529,948 | B1 * | 3/2003 | Bowman-Amuah | 709/217 |
| 2007/0291040 | A1 * | 12/2007 | Bakalash et al. | 345/505 |

OTHER PUBLICATIONS

B. Liblit, A. Aiken, A.X. Zheng, and M.I. Jordan, "Bug Isolation Via Remote Program Sampling," in ACM SIGPLAN PLDI 2003.
Depauw et al., "Drive-By Analysis of Running Programs," 23rd International Conference on Software Engineering, ICSE 2001.
Arnold et al. in "On-line Profiling and Feedback Directed Optimization of Java," Rutgers University, 2002.
Arnold and Sweeney, "Approximating the Calling Context Tree Via Sampling," Technical report, IBM Research, 2000.

* cited by examiner

*Primary Examiner* — John Chavis
(74) *Attorney, Agent, or Firm* — Michael J. Buchenhorner; Derek S. Jennings

(57) ABSTRACT

A method for profiling performance of a system includes steps of: monitoring execution of the system at multiple points during the system's operation; analyzing results derived from the monitoring in order to provide analyzed results; reconfiguring the monitoring non-uniformly according to the analyzed results; and repeatedly performing iterations of the above steps until a particular event occurs. The iterations may be terminated upon: reaching a specified level of analysis precision, determining a source of one or more performance bottlenecks, determining a source of unexpectedly high output or low completion time, completing a predefined number of iterations, reaching an endpoint of an application, or having performed iterations for a specified period of time.

20 Claims, 10 Drawing Sheets

For each child $f_i$ of function f do

{ choose a unique color $c_i$ for $f_i$;

retrieve all the pairs $<g_{ki}, f_i>$ in the <grandcaller,callee> list;

insert color $c_i$ into $g_{ki}$'s color list build a graph with $g_{ki}$ as the vertices, and introduce an edge $<g_{ki}, g_{kj}>$ when $g_{ki}$ and $g_{kj}$ share some common color among them.

run the connected components algorithm on the graph, and find the number n of components.

suggest that function f be partitioned into n parts

| ID | Name | Version | Platform | Call Graph | Sample Data |
|---|---|---|---|---|---|
| ... | ... | ... | ... | ... | .... |
| ... | ... | ... | ... | ... | ... |
| ... | ... | ... | ... | ... | ... |
| 12 | Nastran | 4.1 | power5 | XXX | XXX |

| ID | Metric | Probe | Counter | Event | Description |
|---|---|---|---|---|---|
| ... | ... | ... | ... | ... | ... |
| ... | ... | ... | ... | ... | ... |
| 119 | Cache miss | getCachemiss() | Cache event counter | Region boundary | Get number of cache misses |
| 120 | Time | getTime() | timer | Region boundary | Get wall clock time |

FIG. 9

ITERATIVE, NON-UNIFORM PROFILING METHOD FOR AUTOMATICALLY REFINING PERFORMANCE BOTTLENECK REGIONS IN SCIENTIFIC CODE

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of software optimization and more particularly relates to the field of profiling methods for tuning and optimizing scientific code.

BACKGROUND OF THE INVENTION

Due to the complex nature of supercomputer architectures, tremendous effort must be expended in order to tune and optimize an algorithm or program for a target platform. Performance analysis and optimization are crucial to fully utilizing these high performance computing (HPC) systems, especially when one considers that modern HPC software generally includes millions of lines of code. With the processing speed of these powerful systems now measured in teraflops (equal to one trillion floating point operations per second), one can easily understand that it is essential to identify any performance bottlenecks quickly and accurately when deploying such an application. Without intelligent tools, it is virtually impossible to tune an application within a reasonable timeframe when the target architecture is a massively parallel supercomputer, such as the Blue Gene/L, jointly designed by IBM® and the National Nuclear Security Administration's Lawrence Livermore National Laboratory, with more than 65,000 processors. Profiling is the most commonly-used and effective approach for performance debugging of scientific codes.

One standard approach for profiling is the GNU profiler, or "gprof," as described in "gprof: a call-graph execution profiler" by S. L. Graham et al. and many of its variations. However, gprof has several limitations. First, it lacks the ability to automatically refine the bottleneck regions with more detailed and diversified metrics other than a time metric in order to reveal the cause of the bottleneck. Second, the profiling produces very little or no differentiation in where to focus, and uniform efforts are usually spent across the range, rather than zeroing in on an area of interest. Third, the interaction with expert users is lacking. Last, but not least, gprof usually requires access to the source codes or debugging information for collecting performance metrics. This is often impossible, especially when the sources are proprietary. It may also take a prohibitively long time to re-compile.

After the introduction of gprof, a few other profiling tools emerged, for example, tprof HPROF, jprof. Typically these tools operate by providing a profile of events that occurred after one run. There is no further refinement customized for code regions that have the potential for large performance gain after tuning. Furthermore, the sampling is uniform for the entire address space being studied, and the call chain is only established for immediate parents and children. The biggest drawback of these tools is that they treat all code regions in the same way. Often the granularity of profiling for these methods is either too detailed, wasting too much time on un-interesting regions, or too coarse to be useful at all.

Liblit et al. (see B. Liblit, A. Aiken, A. X. Zheng, and M. I. Jordan, "Bug Isolation Via Remote Program Sampling," in ACM SIGPLAN PLDI 2003) presented a sampling framework for evaluating predicates in an instrumented code. The sampling is done uniformly at random. Every predicate has a probability p of being sampled. With naive implementation, a coin tossing is necessary at each predicate to see whether it is to be sampled at this execution. Yet coin tossing significantly increases the execution overhead. Liblit et al. proposed a technique based on counting down to reduce the cost of coin tossing.

At a higher level, Liblit's research is mainly concerned with bug detection and isolation. Liblit's approach relies on the fact that there are typically many instances of software code running. Sampling can be sparse at any instance, yet the overall samples from a large population are good enough.

DePauw et al. in "Drive-By Analysis of Running Programs," $23^{rd}$ International Conference on Software Engineering, ICSE 2001, proposed tracing details associated with a particular task to reduce the amount of tracing data. The "drive-by" analysis uses directed burst tracing. A burst is a set of trace execution information gathered during an interval of time, associated with a specific task in program. The analyzed programs must exhibit repetitive behavior as the solution relied on direct-request-analyze-direct cycle. The tool user has to direct the analysis to interesting regions.

Arnold et al. in "On-line Profiling and Feedback Directed Optimization of Java," Rutgers University, 2002 use sampling for reducing the cost of instrumentation, and the high-overhead instrumented method is only run a few times. For a method F, there exist two versions, one instrumented (called duplicate) and one original. The duplicate method takes a long time to complete, and thus it is desirable to reduce its overhead. With Arnold et al.'s method, at regular sample intervals, execution moves into the duplicate in a fine-grained, controlled manner.

Sampling also appears in Arnold and Sweeney's work (see "Approximating the Calling Context Tree Via Sampling," Technical report, IBM Research, 2000). They propose using runtime call stack sampling to construct an approximate calling context tree.

While many solutions have been proposed to the problem of optimizing performance of high performance computing systems, none of these solutions adequately address the concerns of: expending uniform effort across a range, rather than narrowing any bottleneck regions with more detailed and diversified metrics; profiling tools that require access to the source codes or debugging information for collecting performance metrics; limiting a call chain to immediate parents and children; and failure to differentiate among code regions.

SUMMARY OF THE INVENTION

Briefly, according to an embodiment of the present invention, an iterative, non-uniform profiling method includes steps or acts of: monitoring execution of the system at multiple points during the system's operation; analyzing results derived from the monitoring in order to provide analyze results; reconfiguring the monitoring non-uniformly according to the analyzed results; and repeatedly performing iterations of the above steps until a particular event occurs. The iterations may be terminated upon: reaching a specified level of analysis precision, determining a source of one or more performance bottlenecks, determining a source of unexpectedly high output or low completion time, completing a predefined number of iterations, reaching an endpoint of an application, or having performed iterations for a specified period of time.

According to an embodiment of the present invention, an information processing system for profiling application performance of a target system includes: an input/output interface configured for interacting with a user of the information processing system; a network interface; a storage; a memory including logic, the logic including: an instrumentation handler for instrumenting the target system; a monitoring handler for monitoring execution of the instrumented target system and collecting performance metrics; an analysis handler for analyzing the performance metrics; and a reconfiguration handler for reconfiguring the instrumentation and monitoring for a next iteration. The information processing system also includes a processor configured to monitor execution of the target system; analyze results derived from the monitoring; reconfigure the monitoring non-uniformly according to the analyzed results; and perform iterations of the above steps.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 7 shows an algorithm that computes the partition for a function using the <grandparent, grandchild> information in the call graph;

FIG. 8 shows an example schema of the database table that stores the information about user applications in an embodiment of the present invention;

FIG. 9 shows an example schema of the database table that stores the information about the performance metrics to collect, their corresponding probes and other data used in the configuration handler and monitoring handler in an embodiment of the present invention.

Figure 1:
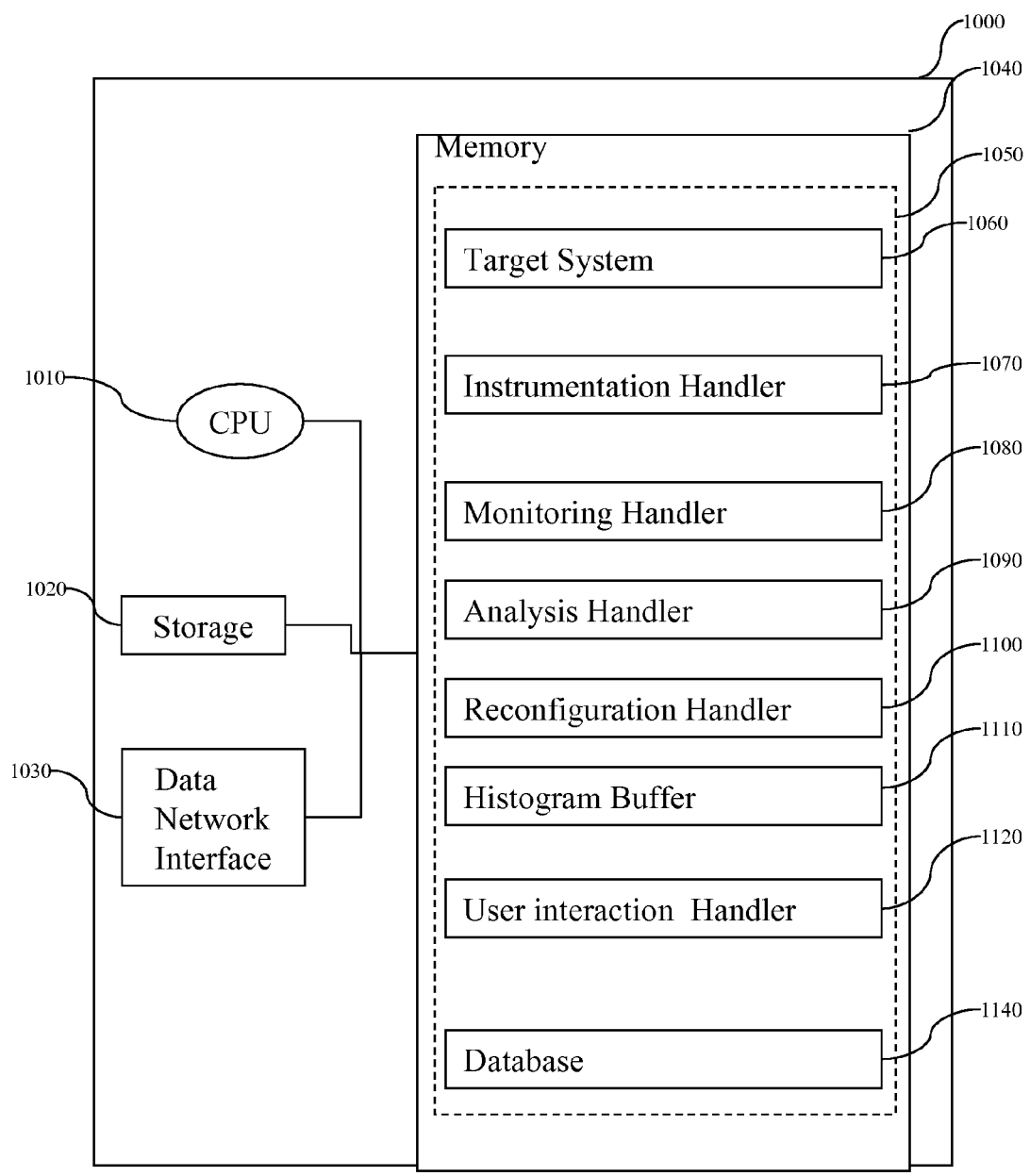
FIG. 1 shows an illustrative block diagram of a server in an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a solution to the problems of inadequate software tuning methods for supercomputer architectures by producing a profiling of time, events, and control flows for scientific codes with detailed and potentially diversified performance metrics for code regions that are interesting to the users. As an example, a particularly time-consuming region of code is likely to be viewed as a potential candidate for optimization. The level of detail and amount of information are varied according to the different regions and the level of interest in those regions.

Referring now to the drawings, and more particularly to FIGS. 1-10, there are shown exemplary embodiments of the method and structures of the present invention.

FIG. 1 illustrates an exemplary system 1000 for performance profiling according to an embodiment of the present invention. The system 1000, as shown, is an information processing system configured to provide an iterative, non-uniform profiling approach for high performance computing systems, automatically refining bottleneck regions of a target application 1060. The target system 1060 is an application on which the performance profiling is performed.

The system 1000 may include any computing node that is able to load and execute programmatic code, including, but not limited to: products sold by IBM such as ThinkPad® or PowerPC®, running the operating system and server application suite sold by Microsoft, e.g., Windows® XP, or a Linux operating system. System logic 1050 is embodied as computer executable code that may be loaded from a remote source such as a network file system, local permanent optical device such as a CD-ROM, magnetic storage such as disk, or storage 1020 loaded into memory 1040 for execution by a CPU 1010.

Figure 10:
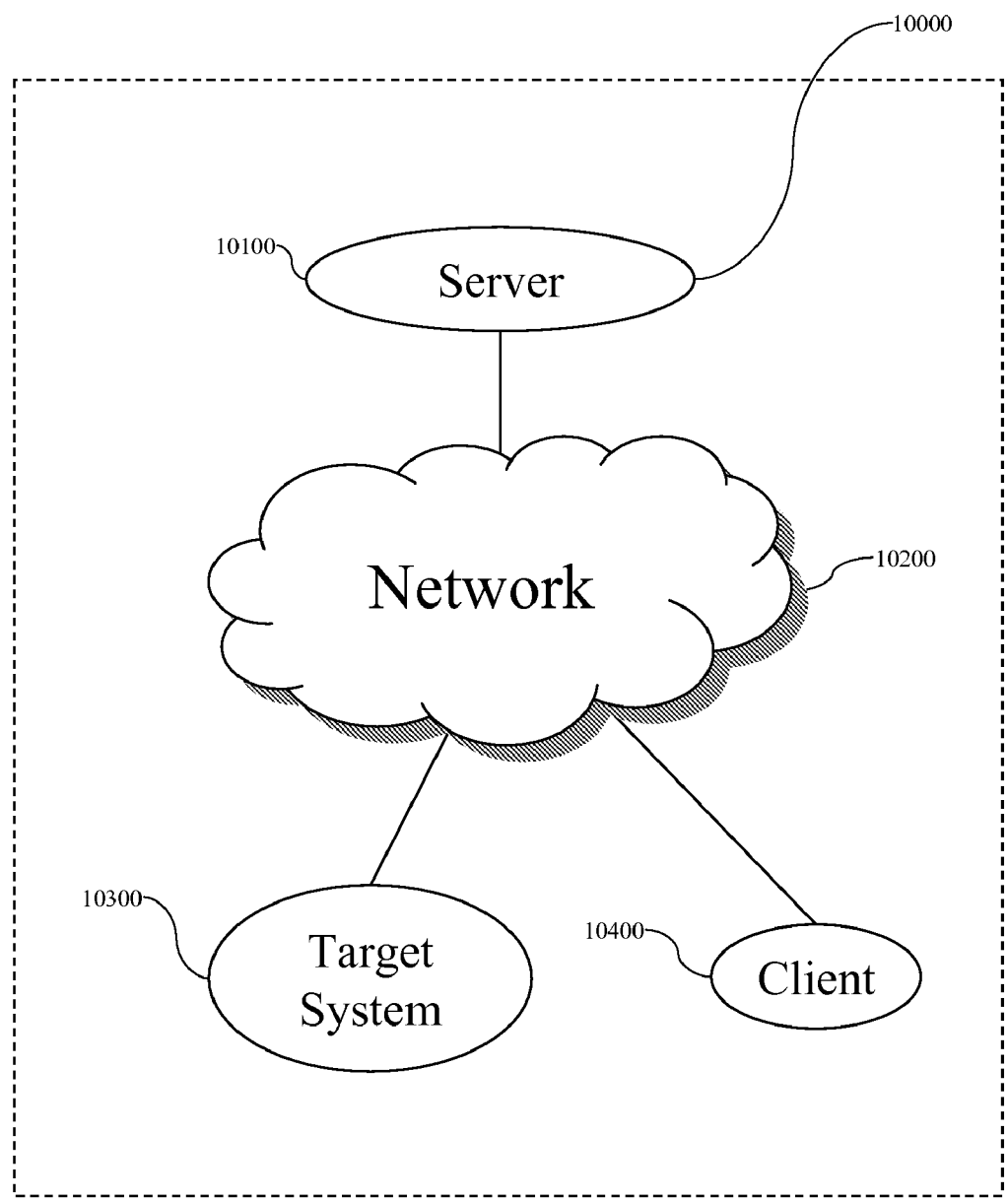
FIG. 10 shows an illustrative diagram of a network topology of another embodiment of the present invention, wherein the target system and the profiling server run on separate network nodes.

As will be discussed in greater detail below with reference to FIGS. 1-10, the memory 1040 includes computer readable instructions, data structures, program modules and application interfaces forming the following components:

an instrumentation handler 1070 for instrumenting a target system 1060 and potentially its environment, including entities that interact with an application of the target system 1060, for example the operating system, with probe libraries for performance data collection;

a monitoring handler 1080 for monitoring the execution of an instrumented target system 1060, and for collecting the appropriate performance metrics;

an analysis handler 1090 for analyzing the stream of metrics collected by monitoring handler 1080;

a reconfiguration handler 1090 for reconfiguring the instrumentation and monitoring for the next iterative step and according to the analysis generated by the analysis handler 1090;

a histogram buffer 1110 for storing metrics;

a user interaction handler 1120 for handling any interaction with a user; and a server database 1140 which enables the storage, modification and retrieval of data. Such a component includes, but is not limited to, the DB/2 product sold by IBM®;

An additional component as shown in FIG. 1 is the target system 1060 which may be brought in as a component of the memory 1040. However, in another embodiment as shown in FIG. 10, the target system 1060 is on a separate node and perhaps a separate network.

It should be noted that the components as described above are logical constructs and should not be interpreted to limit the constructs to physical components of a system. Some or all of the components may be embodied in software, hardware, or firmware.

Figure 2:
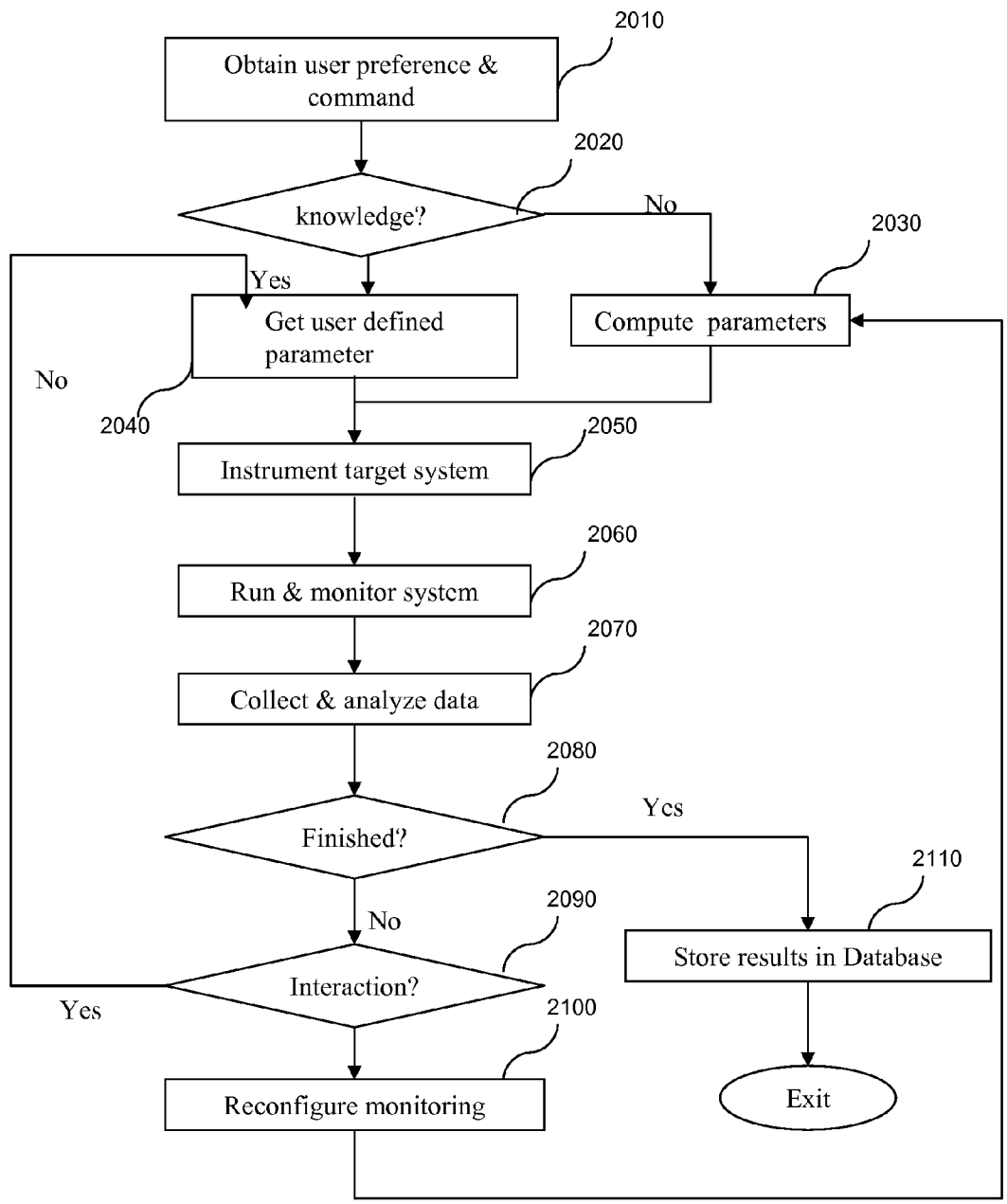
FIG. 2 shows a flow diagram illustrating flow control of a server in an embodiment of the present invention.

Referring to FIG. 2 there is shown a flow chart providing an overview of the method of the current invention. As depicted in FIG. 2, in step 2010 the profiling tool 1000 first obtains the user's preference and command via the user interaction handler 1120. A user of the system 1000 will most likely be an information technology (IT) administrator. The IT administrator is usually interested in a certain kind of performance behavior, for example, performance bottlenecks, anomalies or components that perform particularly well, or particularly poorly. The administrator may or may not have any prior knowledge about the application 1060 in decision 2020.

If this is the first time that a user has worked with the application 1060, the user may not have much prior knowledge about the system 1060. In this scenario, a user may need to compute operating and/or performance parameters in step 2030. However, quite often a user has knowledge about the application 1060, and has a somewhat clear notion of where to hunt for the cause of a specific performance behavior. For example, an application 1060 behaves in an unusual manner when it is ported from one architecture, such as IBM® Power5, to a different architecture, perhaps BlueGene. In this case, the user has a good understanding of the application 1060, and the user is very likely to be able to restrict the search space to certain regions of the code in step 2040. We denote such regions as target regions. Target regions can be a set of address intervals, and they are in the form of groups of user functions, loops, and statements.

According to either the input from an informed user or a default configuration accepted by a new user, in step 2050 the instrumentation handler 1070 instruments the target system 1060. Next in step 2060 the instrumented system 1060 is run under the monitoring handler 1080 and generates a trace of performance metrics which it stores in the database 1140. The analysis handler 1090 analyzes the performance data in step 2070 and attempts to pinpoint refined regions. For example, sampling might show that the function foo takes more time (e.g., 100 seconds) than expected. Furthermore it is also discovered that foo makes a large number of MPI communication calls.

In step 2080 a determination must be made before running another iteration. In this step, an analyst must determine if the performance knowledge gathered meets a predefined criteria. The predefined criteria falls into two categories: criteria predetermined by a user or system criteria. An example of the latter would be: reaching the termination of an application or reaching a time limit. An example of the former would be: reaching a specified level of analysis precision, determining a source of one or more performance bottlenecks, determining a source of unexpectedly high output or low completion time, or completing a predetermined number of iterations. This list is by no means exhaustive. Other criteria may be selected and the criteria may change with each iteration.

Once a determination has been made that a certain criteria has been met, the profiling iteration stops and the results are stored in a database 2110. Alternatively, the results may be immediately presented to the user, in which case they may not need to be stored. Storing results, however, is recommended for tracking historical data and trends. In some cases it may be preferable to output results in between iterations without waiting for the iterations to stop. This gives an analyst the opportunity to step in and manually adjust the instrumentation according to any intermediate results.

If the performance results do not match the predefined criteria, the reconfiguration handler 1100 reconfigures the monitoring for closer inspection of foo in step 2100 and then allows the method to iterate. The analyst may elect to alter the criteria or introduce new criteria at this point. In the case where the user wishes to interact with the profiling method in step 2090, for example, to substitute the target system with a tuned one (since the user may acquire the profiling information and is able to try to eliminate the bottleneck) or to provide more insight from experience, the user interaction handler 1120 retrieves new parameters for the profiling and iterates.

The instrumentation handler 1070 instruments the target system 1060 for performance data collection. Performance metrics include, but are not limited to: time, the number of certain hardware events, operating system events, and user defined events. Instrumentation can be done at various levels, including source level, assembly code level, binary level, or even on the binary image inside the memory. In turn, the implementation can be any one of, but not limited to, source-to-source translation, assembly-to-assembly translation, binary rewriting, or internal memory rewriting. The advantages with source and assembly translation are that the probes are seamlessly integrated into the application, and do not require a complicated mechanism to implement. The biggest disadvantage, however, is their dependence on the source or assembly code that is usually not open. Working on the binary or memory image removes that dependency, and in many cases is essential in instrumenting the application.

As various components of a computer system interact with each other, instrumentation may also be done on components outside the scope of the application but within its environment. For example, an application usually interacts closely with and is supported by operating systems, and operating system instrumentation may be necessary. The instrumentation handler 1070 inserts probes into target system 1060 at strategic locations determined by the monitoring handler's 1080 analysis in order to take a snapshot of the system at an appropriate time and scenario. One example of the probe can be to get the wall-clock time.

The monitoring handler 1080 monitors the execution of the target application 1060, and chooses the appropriate probe actions for certain events, and passes them along to the instrumentation handler 1070 to be spliced into the application 1060 or system at strategic locations. The monitoring handler's 1080 analysis also controls the frequency, level of details, and scale of operations for performance metrics collection. Monitoring can be implemented with two modes. With the "parasite" mode, the monitoring handler 1080 is closely coupled with the instrumentation handler 1070; its functionality is implemented in large by the probe actions spliced into the target system. The binaries of the target system 1060 usually do not change during the life of the execution.

Alternatively, monitoring can also be done through the "big brother" mode, where monitoring handler 1080 supervises the execution of the application 1060 during part of or the whole of its life span. While activated, the monitoring handler 1080 constantly watches the execution of the target system 1060, and it has the flexibility to add additional probe actions or remove existing ones. The current invention includes both modes, parasite and big brother, with the choice depending on the target system 1060, and the specific operations that are provided to the user. The monitoring handler 1080 collects a stream of performance metrics that it may choose to store in the server database 1140.

Since monitoring can interfere with the target system 1060 and its environment, it is desirable to keep the interference of the original system to a minimum. The frequency, level of details, and scope of operation all have an impact on the execution of the target system 1060, and they should not be increased to an excessive level that severely hampers performance or distorts the metrics. On the other hand, close monitoring is more likely to capture detailed performance data to reveal findings about performance behavior. To strike a balance, a method according to the present invention adopts a non-uniform sampling and monitoring approach. The profiling provided by this method is capable of narrowing the monitoring to those target regions that reveal more of the targeted performance behavior.

Figure 3:
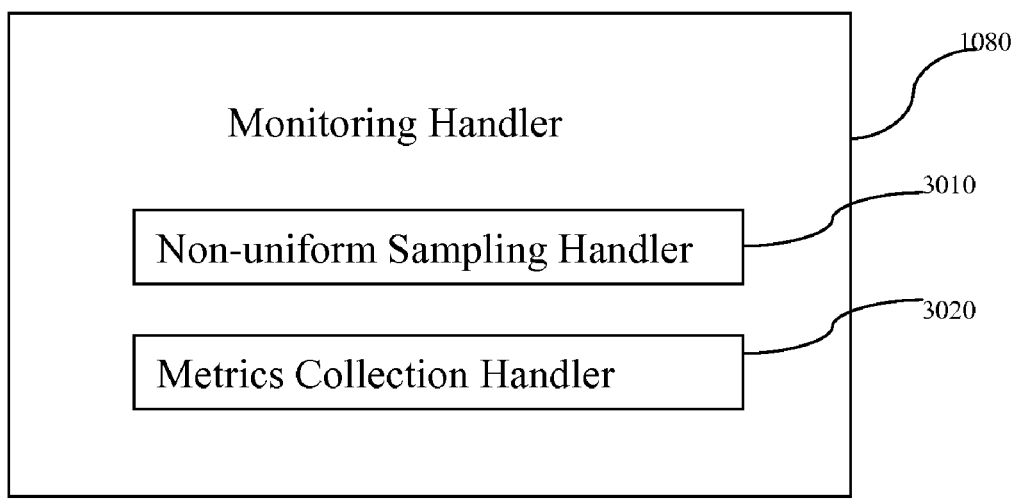
FIG. 3 shows an illustrative block diagram of the monitoring handler in an embodiment of the present invention.

FIG. 3 is a simplified block diagram representation of the monitoring handler 1080. The monitoring handler 1080 contains two other handlers, the non-uniform sampling handler 3010 and the metrics collection handler 3020.

Figure 4:
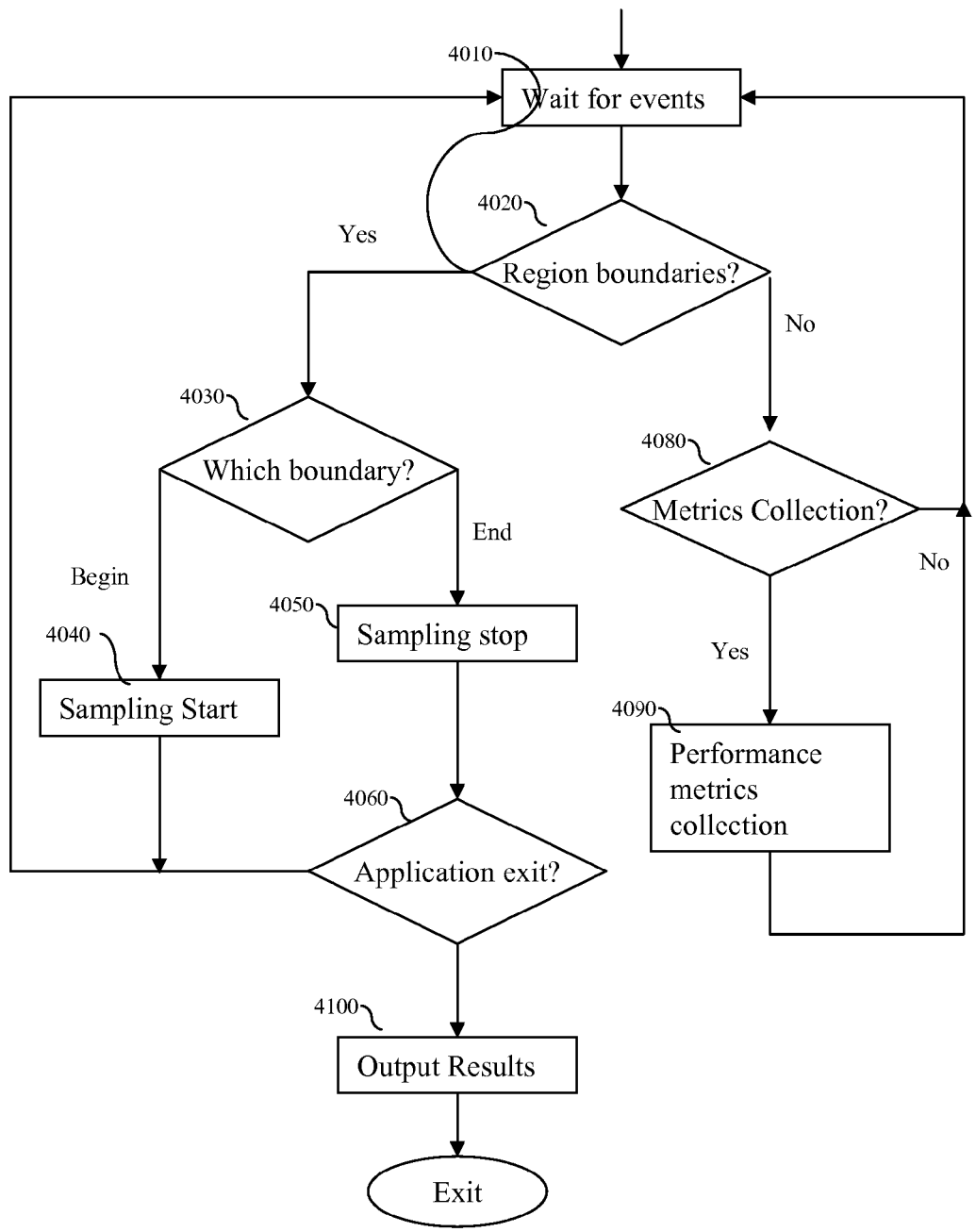
FIG. 4 shows a flow diagram illustrating flow control of the monitoring handler in an embodiment of the present invention.

Referring to FIG. 4 there is shown a flow chart of the processing performed by the monitoring handler 1080. The monitoring handler 1080 is event-driven. In step 4010 the monitoring handler 1080 sits in a loop waiting for events to occur (in the parasite mode the monitoring handler 1080 is merged with the target system, but conceptually it is triggered by the events).

At decision point 4020, the monitoring handler 1080 differentiates between two types of events: region boundary events and metrics collection events. In step 4030 at the boundary event, at the beginning of a boundary, the monitoring handler 1080 sets the appropriate parameters for non-uniform sampling in step 4040. At the end of a boundary the monitoring handler 1080 stops the sampling and stores the performance metrics collected in step 4050. If that event at the same time signifies the termination of the application in step 4060, the metrics may also be sent to the server database in step 4100 or otherwise presented to a user and/or client of the system. The information gathered as a result of the profiling process may be presented to a user in many different formats. The results may be presented in a report format viewable via a web browser. The results may be presented graphically as a bar graph or other graphical format.

For a metrics collection event as determined at decision point 4080, the monitoring handler 1080 simply collects the corresponding metrics and stores it for later analysis in step 4090.

Figure 5:
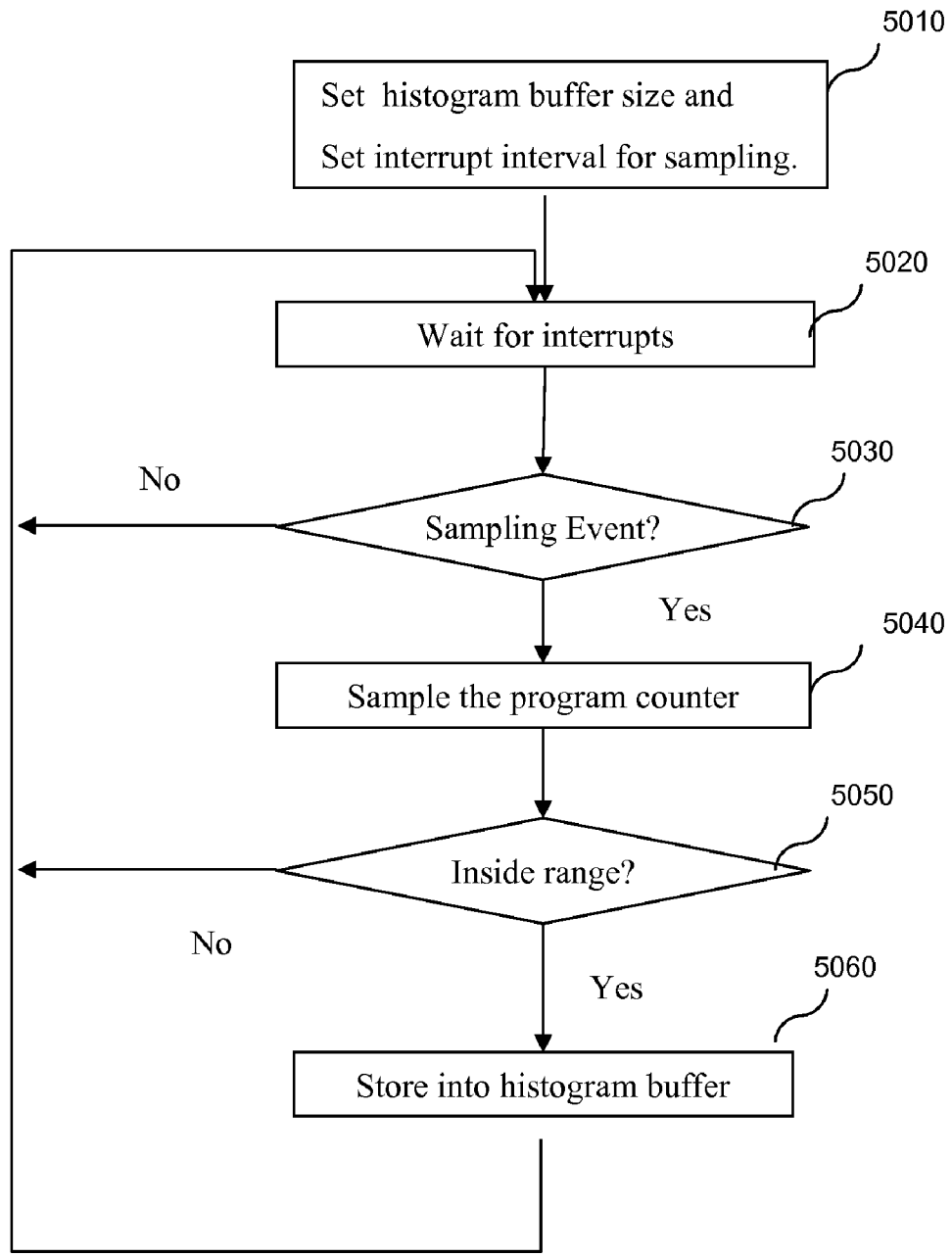
FIG. 5 shows a flow diagram illustrating flow control of the non-uniform sampling handler in an embodiment of the present invention.
Figure 6:
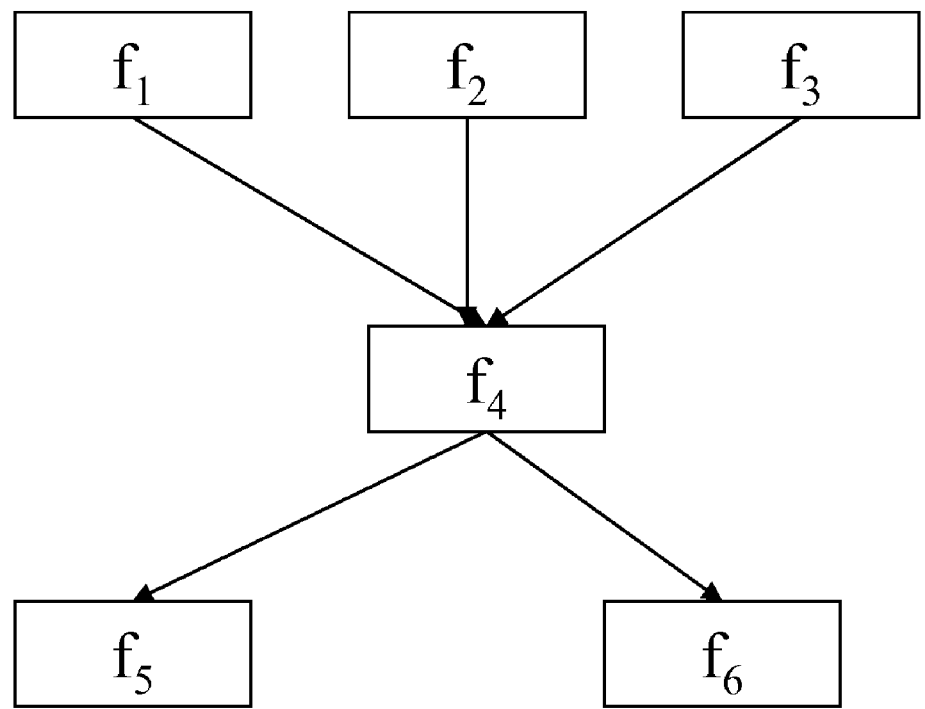
FIG. 6 shows an illustrative block diagram of the call graph where longer call-chain chasing is helpful in determining the correct control flow.

Handling the samples is further described in the flow chart of FIG. 5. There are two parameters that determine the behavior of the sampling handler 3010. The first is the sampling interval (as described below, this interval is logical and is not always based on time), and the second is the size of the buffer for holding the histogram of samples. The sampling handler 3010 sets up the sampling interval and histogram buffer 1110 size in step 5020. It then sits in a loop waiting for sampling events to occur in step 5020.

At the sampling event determined at decision point 5030, the sampling handler 3010 retrieves the value of the current program counter in step 5040, and verifies that it is inside the range of target regions in decision point 5050. If so, the corresponding histogram entry is increased in step 5060.

Referring again to FIG. 3, the monitoring handler 1080 contains two components: the non-uniform sampling engine 3010 and the metrics collection engine 3020. Sampling is a statistical method for inferring the performance from the distribution of the samples. The value of the program counter is sampled at some predetermined interval denoted as "tick," and a histogram of ticks are generated for an address range. The sampling technique is essentially an approximation method for performance profiling.

There are two parameters that control the accuracy of sampling. The first parameter is the sampling frequency, and the second parameter is the size of the histogram. Sampling frequency determines how frequently the program is stopped and the program counter value is sampled. The histogram size is in direct proportion to how many addresses are represented by one entry in the histogram. With higher sampling frequency (i.e., a smaller "tick") the approximation results become more accurate. However, increasing the sampling frequency may result in prohibitive performance costs and too much disturbance on the system. Similarly, the larger the histogram size, the more accurately the profiling can attribute the ticks to the target address. Ideally the histogram size matches the program address space; however, this would expend too much memory and result in cache performance degradation.

Sampling first proceeds by allocating a portion of memory to be used for the histogram buffer 1110, and then sets up an interrupt. Setting up the interrupt can be implemented by setting up a timer, requesting an operating system interrupt, or setting up a hardware events interrupt. The handler 3010 then goes into wait mode indefinitely for interrupts to occur until the completion of the application or some other predetermined cessation event. If the interrupt is related to the sampling events, the sampling handler 3010 will capture the current value of the program counter. If the value is inside of a designated range, it then adds one tick to the corresponding histogram entry, otherwise it goes back to wait for another interrupt.

Non-uniform sampling works with a high sampling rate at target regions, and switches to a low sampling rate or even non-sampling outside of the target regions. Once the program enters a target region, the sampling rate increases to X times the sampling ratio outside of the target region. X is a value greater than or equal to one. The value for X may be a pre-selected default value such as 2, or the value of X can be provided by the user. X may be different for different target regions. For example, assume a sampling ratio outside of a target region is set at 1 sample per 0.05 seconds. A sampling ratio for one target region may be set at 1 sample per 0.005 seconds, and for another target region the ratio may be 1 sample per 0.07 seconds. X may also be accumulated across iterative runs.

Non-uniform sampling also assigns larger memory portions to the target regions and smaller memory portions to the rest of the address space. This assignment of memory may be provided by the user's metrics and initial instrumentation. However, the assignment, or in some cases, reassignment of memory, may occur as a result of actions taken by the reconfiguration handler 1100. As results are analyzed and a region of interest is detected, the reconfiguration handler 1100 will change the previous instrumentation to assign more resources to the region of interest.

Depending on the operating system, the actual implementation of sampling uses timer interrupts or operating system support. The monitoring handler 1080 establishes the appropriate sampling rates.

Sampling may also be based on "ticks" other than time. An example of such ticks is a certain number of cache misses observed. A tick can be triggered by an event, and each individual tick can span a unique time interval. In this case the profiling is not concerned with the time distribution but rather event distribution. A distribution of events over the address space can be established. The profiling shows how many cache misses or translation lookaside buffer (TLB) misses a certain region of code generates. Modern architectures provide up to hundreds and even thousands of hardware events that can be used for performance profiling, and they are highly useful for determining the cause of performance behavior. These events are usually measured by a small set of hardware counters, so multiple runs are necessary to flag all the distributions of hardware events meaningful to a certain behavior. To sample the target system based on such "ticks" triggered by hardware events, the hardware needs to be able to generate interrupts based on these events. This capability is supported on most modern architectures, for example, the IBM® Power5. And the profiling can provide such information.

Multiple sampling can be programmed to occur simultaneously. Yet the overhead again is an important factor to consider. Naturally with small ticks, the profiling attains higher accuracy for a certain metric. Using small ticks uniformly across the whole address space of the target system can be costly. High sampling frequency should only be directed at target regions related to the performance behavior being tracked, and low sampling frequency is adopted outside these regions. Similarly a distribution of software events, such as operating system events or user defined events, can be achieved.

Monitoring also involves performance metrics and related information collection. There are many metrics that can provide information about different aspects of the application, and combined they can further improve the details of the profiling and infer the cause of specific performance behavior. More comprehensive performance metrics gathering should be limited to small regions of the code in order to minimize the impact on performance.

A method according to an embodiment of the present invention implements long call-chain chasing. Longer call-chain chasing helps solve the following two problems. Consider the call graph shown in FIG. 6. Functions $f_1$, $f_2$, and $f_3$ all call function $f_4$, and $f_4$ in turn calls functions $f_5$ and $f_6$. During the actual execution, $f_5$ and $f_6$ may not both be in each of $f_1$, $f_2$, and $f_3$'s call-chain. In this case the code should be restructured (e.g., break up $f_3$ so that there are two disconnected call-chains). For ease of notation, this problem is denoted as the restructure problem. Regular call graphs generated by gprof do not detect this scenario as the grandparent-grandchildren relationship is not detected by gprof. An advantage of the profiling method according to the present invention is that, instead of recording only the caller-callee pairs, the profiling delves deeper in the stack frames so that it can further distinguish the grandparents of a node in the call graph.

Even if $f_5$ and $f_6$ are descendants from all of $f_1$, $f_2$, and $f_3$, their contribution to the inclusive execution time of their grandparents may well be different. This problem is denoted as the "proper attribute problem." Again gprof does not distinguish this difference. When sampling for CPU time, in addition to getting the program counter value, we also record a chain of the calling site addresses. Thus, associated with each "tick" is not only a program counter value, but also all necessary information for identifying the chain of functions whose invocation resulted in the "tick." When processing the profiling data, we can then fully attribute the amount of time spent in $f_5$ and $f_6$ to $f_1$, $f_2$ and $f_3$ respectively. Chasing longer call chains obviously is much more costly, and the overhead is no longer negligible with the number of function calls in applications such as gcc and gzip. It should also be noted that the problem may involve many levels of function calls. This application should only be applied judiciously to a small region of the code, not across the board.

The performance data collected by the monitoring handler 1080 is fed to the analysis handler 1090. Analysis handler 1090 reconstructs the entire scenario regarding performance, and correlates the various metrics to the entities in the target systems. The analysis can be "post mortem" after each execution for the parasite mode, or "on the fly" for the big brother mode. For the behavior of scientific applications that usually run on dedicated powerful computers, once they are tuned, they will run for many iterations without change. Therefore, post mortem analysis often suffices for these applications.

Analysis on the fly can also be applied. In this case the analysis handler 1090, monitoring handler 1080, and instrumentation handler 1070 work closely together. Analysis handler 1090 parses the data. One of its primary tasks is to establish a connection between performance metrics and the program construct of the target system 1060, and further identify the regions for more detailed monitoring. When the analysis is done in a post mortem manner, it can afford to take more time than an on the fly analysis, and the data collected by the monitoring handler 1080 meets the bare minimum requirement for reconstruction.

Another task for the analysis handler 1090 is to build a call graph. The graph captures the dynamic invocation of functions for the execution. More importantly, the analysis also annotates the graph with performance information by linking the sampling data with the caller-callee metrics. This is traditionally done by profilers like gprof. For long call-chain chasing, in addition to the overhead of metrics collection and sampling produced by the monitoring handler 1080, the overhead of analyzing the performance data by the analysis handler 1090 is significantly higher.

As an example, we analyze the cost for the restructure problem. The analysis algorithm for the restructure problem is shown in FIG. 7. The algorithm 700 detects a partition of function $f$ by running a connected components algorithm on the graph built on the parent of $f$. Each parent of $f$ becomes a vertex in the graph, and if in the call graph they share some common grandchild, an edge is introduced between them. In the worst case, building the graph takes $O(n^2)$ time, and can be very time consuming if n is large. This wouldn't be a problem, however, if the analysis is only done on a small region of the code.

The results from the analysis handler 1090 are fed back to redirect the monitoring. This is done through the monitoring reconfiguration handler 1100. Monitoring reconfiguration handler 1100 reconfigures monitoring and instrumentation according to the analysis for the target regions, and determines the corresponding metrics to collect and probe actions to take. As there are potentially quite a few target regions that are closely related to certain performance behavior, for example, computation, communication, and I/O, the monitoring reconfiguration handler 1100 can choose to activate different sampling and metrics collection actions for different regions. In addition, one of the important functions of the reconfiguration handler 1100 is to enable the checkpoint capability for speeding up the iterative process.

For long running applications, each iteration of the profiling potentially takes a long time to execute. Yet each profiling run can also yield a wealth of information (or the knowledge input from an experienced user) that can be used to speed up the process. Based on the profiling information, the monitoring reconfiguration handler 1100 can select to checkpoint the target system 1060 at strategic locations, for example, the entry of a time-consuming function or the beginning of a loop that generated bad cache behavior in the previous run, so that the computation prior to that run can be obviated.

The user interaction handler 1120 is the interface between the profiling process and the user. This handler 1120 accepts input from users and presents the results to the user. During the iteration process, the user may also choose to assist the process with expertise by specifying the regions to monitor and metrics to collect, although that is purely optional.

The user interaction handler 1120 can also accept updated target systems for profiling in an interactive mode with the user. After the discovery of the cause of certain performance behavior, the user may want to modify the system for more experimentation. The user interaction handler 1120 accepts the updated target system for further studying.

The server database 1140 in this exemplary embodiment provides for creation, deletion and modification of persistent data, and is used by the handlers 1060-1120 of the server 1000. In one embodiment of the current invention, the server database 1140 includes two sets of tables, one table 800 for the target system and one table 900 for the profiling configuration, each depicted in FIGS. 8 and 9, respectively. The table 800 for the target system records knowledge learned from profiling runs. The knowledge can be either obtained from an experienced user, or from the actual profiling run in prior executions. Such knowledge can greatly speed up the profiling process and reduce the number of iterations needed. As shown in FIG. 8, the table contains six fields that record the knowledge about a target system. The information includes ID, the application name, the version, the platform for the profiling run, the encoded resulting call graph, and the sampling data. In FIG. 9, the table 900 contains six fields for the instrumentation and monitoring configuration. It should be noted that these exemplary embodiments are presented by way of example and should not be construed as limiting the scope of the invention to the six fields shown here.

Referring to FIG. 10 there is shown an illustrative example of a system 10000 wherein the target system 10300, the client 10400 and the profiler 10100 are on different network nodes, according to another embodiment of the present invention. A client 10400 may interact with a profiler system 10100 through a local area network (LAN), metropolitan area network (MAN) or a wide area network (WAN) such as the internet 10200. The client 10400 provides the profiler 10100 with information and a location of a target system 10300 to be profiled. The profiler 10100 may perform all of the profiling processes as described in this disclosure through a network. The profiler 10100 can then present the results of the profiling to the client 10400, again through the network, where the results may be viewable through the client's web browser. An advantage of this system 10000 is that the profiler 10100, client 10400, and target system 10300 need not be co-located.

The method embodiments as discussed herein may be provided as a service to the client 10400 in return for compensation as per a service agreement. The client 10400 may be billed for the services on a per-use basis, perhaps when the results of the profiling are complete and presented to the client 10400; or in the alternative the client 10400 may subscribe to the service and pay a monthly fee for the service. Client account information may be stored in storage 1020. The client account information may include a unique identifier for the client, a description of the target system 10300 or systems, and historical data regarding the target system or systems 10300. In one embodiment, the client 10400 is provided with restricted access to the profiler 10100 in order to run the profiling instructions. A log is kept by the profiler 10100 tracking the resources used and the amount of time the client 10400 spent using the system in order to calculate a fee amount, similar to the way in which some legal research databases calculate fees to clients of those systems.

Therefore, while there have been described what are presently considered to be the preferred embodiments, it will be understood by those skilled in the art that other modifications can be made within the spirit of the invention. The embodiments described above are illustrative examples and should not be construed as limiting the present invention to these particular embodiments. The embodiments, as described, were chosen in order to explain the principles of the invention, show its practical application, and enable those with ordinary skill in the art to understand how to make and use the invention. Thus, various changes and modifications may be effected by one skilled in the art without departing from the spirit or scope of the invention as defined in the appended claims.

We claim:

1. A method for profiling performance of a target system, the method comprising steps of:
    monitoring execution of the target system at multiple points during the target system's operation;
    analyzing results derived from the monitoring in order to provide performance results;
    reconfiguring the monitoring non-uniformly according to the performance results;
    repeatedly performing iterations of the monitoring, analyzing, and reconfiguring steps until a particular event occurs; and
    presenting the performance results to a user.

2. The method of claim 1 further comprising a step of:
    terminating the iterations when the particular event occurs, wherein the event is selected from a group consisting of: reaching a specified level of analysis precision, determining a source of one or more performance bottlenecks, determining a source of unexpectedly high output or low completion time, completing a predefined number of iterations, reaching an endpoint of an application, and having performed iterations for a specified period of time.

3. The method of claim 1 wherein the monitoring step comprises a step of
    inspecting a state of the target system, wherein the state comprises at least one selected from a group consisting of: variables, stacks, a program counter, an operating system state, and hardware.

4. The method of claim 1 wherein the monitoring step comprises a step of
    inspecting a state of an operating environment associated with the target system, wherein the state comprises at least one selected from a group consisting of: variables, stacks, a program counter, an operating system state, and hardware.

5. The method of claim 1 wherein the monitoring step comprises a step of:
    instrumenting the target system using probes.

6. The method of claim 1 wherein the monitoring step comprises a step of:
    instrumenting an environment of the target system.

7. The method of claim 1 wherein the presenting step comprises
    presenting the performance results to the user after each iteration.

8. The method of claim 1 wherein the monitoring step is predicated upon at least one dimension selected from a group consisting of: sampling frequency, level of detail, and performance metrics to be collected.

9. The method of claim 1 wherein the monitoring step can be performed in one of two modes: parasitic mode and big brother mode.

10. The method of claim 1 wherein the monitoring step comprises performing at least one of the following: sampling, call-chain chasing, hardware events gathering, and potential operating system events gathering.

11. The method of claim 1 wherein the monitoring step further comprises a step of:
   utilizing different monitoring methods according to regions of the target system, wherein the different monitoring methods are selected from a group consisting of: types of instrumentation, levels of data collection, and numbers of monitoring points.

12. The method of claim 1 wherein the reconfiguring step comprises a step of increasing the monitoring of target regions.

13. The method of claim 12 wherein the reconfiguring step comprises a step of decreasing the monitoring of regions that are not target regions.

14. The method of claim 1 wherein the analyzing step comprises manual analysis.

15. The method of claim 1 wherein the analyzing step comprises automated analysis performed by a program instructed to discover target regions.

16. The method of claim 8 wherein the non-uniform reconfiguration comprises dimensions selected from a group consisting of: higher frequency and a finer granularity of detail being applied to target regions; and a lower frequency and coarser granularity of detail applied outside the target regions.

17. The method of claim 1 wherein the step of repeatedly performing iterations comprises commencing the iterations according to a predefined event.

18. The method of claim 17 wherein the predefined event is at least one selected from a group consisting of: termination of each execution of the target system, termination of each repetitive subtask, checkpoint of the target system, and restart of the target system.

19. The method of claim 18 wherein a first user performs the method for a second user according to a predetermined agreement.

20. An information processing system for profiling application performance of a target system, the system comprising:
   an input/output interface configured for interacting with a user of the system;
   a network interface;
   a storage area;
   a memory comprising logic, wherein the logic comprises:
      an instrumentation handler for instrumenting the target system;
      a monitoring handler for monitoring execution of the instrumented target system and collecting performance metrics;
      an analysis handler for analyzing the performance metrics; and
      a reconfiguration handler for reconfiguring the instrumentation and monitoring for a next iteration; and
   a processor configured to:
      monitor execution of the target system;
      analyze results derived from the monitoring;
      reconfigure the monitoring non-uniformly according to the analyzed results;
      and repeatedly perform iterations of the above steps.

* * * * *